Patented Oct. 7, 1930

1,777,365

UNITED STATES PATENT OFFICE

CECIL HOLLINS AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF AERATED WATERS, SPARKLING DRINKS, AND THE LIKE

No Drawing. Application filed August 5, 1927, Serial No. 211,002, and in Great Britain August 19, 1926.

One of the disadvantages of ordinary aerated waters is that as soon as the liquid is poured into a glass, practically all the gas with which it is charged is given off at once and the liquid becomes "flat" and loses its sparkle.

We have discovered that if a small proportion, e. g. 0.01–0.1 per cent of certain substances hereinafter described be included in the ingredients of the liquid before or after aeration, the liquid acquires the property of retaining the gas with which it is charged and the latter is evolved more gradually on exposure to air, with formation in most cases of a "froth".

The substances we use for this purpose belong to the classes known as dispersing agents and wetting-out agents, namely, the sulphonic acids derived from formaldehyde-naphthalene or formaldehyde-phenol condensation products, the alkylnaphthalene sulphonic acids, the substances prepared from mineral oils and isopropyl alcohol sulphonated according to co-pending application No. 195,585 filed by one of us, Ernest Chapman and another, lignin sulphonic acids, naphthenic acids, taurocholic acid, sulphonated higher fatty acids, and the like.

The substances (usually in the form of their sodium salts) may be applied in different ways. They may be added dry or in the form of a solution before aeration or bottling. They may also be added to the flavouring solutions used in "soda-fountains" or to the aerated water used in such soda-fountains. It is understood, of course, that the substances used should be free from all poisonous impurities.

Methods of applying our invention are illustrated by, but not limited to, the following examples.

*Example 1.*—To the usual flavouring syrup is added from 0.1 to 0.2 per cent of its weight of a substance included in the above description in the form of concentrated solution. The flavouring syrup is then run in small portions into bottles which are filled up with water and aerated in the usual manner.

*Example 2.*—To a flavouring syrup for use in soda-fountains is added sufficient of one of the dispersing agents defined to provide with each "dose" of the syrup about 0.05 gram of dispersing agent, the "dose" being the amount of flavouring syrup used for an ordinary tumbler full (i. e. about 10 fluid ounces) of effervescent drink.

*Example 3.*—1 part by weight of one of the defined dispersing agents is incorporated with 500 parts by weight of an effervescent saline mixture of the ordinary type, containing an alkaline carbonate or bicarbonate, and a solid acid or acid salt with the usual addition of sodium sulphate or magnesium sulphate and flavouring matter, if desired. When one or two teaspoons-full are stirred into a glass of water in the customary manner, the mixture effervesces as usual, but after the first effervescence has ceased, the quiescent liquid remains "sharp" and palatable, instead of "flat" and unpleasant to the taste.

What we claim and desire to secure by Letters Patent is:—

1. In the manufacture of effervescent potable liquids containing dissolved carbon dioxide as an essential ingredient, the process which comprises adding to such liquid a sulphonic acid of high molecular weight belonging to the class of wetting-out and dispersing agents.

2. In the manufacture of effervescent potable liquids containing dissolved carbon dioxide as an essential ingredient, the process which comprises adding to such liquid sulphonated isopropylated petroleum fractions.

3. In the manufacture of fermented liquids containing dissolved carbon dioxide as an essential ingredient, the process which comprises adding to such liquid at some stage of manufacture, a sulphonic acid of high molecular weight belonging to the class of wetting-out and dispersing agents.

4. In the manufacture of fermented liquids containing dissolved carbon dioxide as an essential ingredient, the process which comprises adding to such liquid sulphonated isopropylated petroleum fractions.

5. Potable liquids containing as an essential ingredient dissolved carbon dioxide and a sulphonic acid of high molecular weight belonging to the class of wetting-out and dispersing agents.

6. Potable liquids containing as an essential ingredient dissolved carbon dioxide and sulphonated isopropylated petroleum fractions.

7. Fermented liquids containing as an essential ingredient dissolved carbon dioxide and a sulphonic acid of high molecular weight belonging to the class of wetting-out and dispersing agents.

8. Fermented liquids containing as an essential ingredient dissolved carbon dioxide and sulphonated isopropylated petroleum fractions.

In testimony whereof we affix our signatures.

CECIL HOLLINS.
ERNEST CHAPMAN.